United States Patent
Kloza et al.

(10) Patent No.: US 11,506,636 B2
(45) Date of Patent: Nov. 22, 2022

(54) SYSTEM AND METHOD OF SUBMITTING DATA FROM INDIVIDUAL SENSORS OVER A SHARED CABLE

(71) Applicant: Molex, LLC, Lisle, IL (US)

(72) Inventors: Mariusz Kloza, Westmont, IL (US); Alexander S. Chernyshov, Naperville, IL (US)

(73) Assignee: Molex, LLC, Lisle, IL (US)

( * ) Notice: Subject to any disclaimer, the term of this patent is extended or adjusted under 35 U.S.C. 154(b) by 106 days.

(21) Appl. No.: 16/981,695

(22) PCT Filed: Mar. 22, 2019

(86) PCT No.: PCT/US2019/023613
§ 371 (c)(1),
(2) Date: Sep. 17, 2020

(87) PCT Pub. No.: WO2019/183490
PCT Pub. Date: Sep. 26, 2019

(65) Prior Publication Data
US 2021/0096105 A1 Apr. 1, 2021

Related U.S. Application Data

(60) Provisional application No. 62/646,664, filed on Mar. 22, 2018.

(51) Int. Cl.
*G01N 29/04* (2006.01)
*G01N 29/32* (2006.01)
*G01N 29/07* (2006.01)

(52) U.S. Cl.
CPC ........... *G01N 29/07* (2013.01); *G01N 29/043* (2013.01); *G01N 29/326* (2013.01);
(Continued)

(58) Field of Classification Search
CPC .... G01N 29/326; G01N 29/043; G01N 29/07; G01N 2291/0258; G01N 2291/02854; G01N 2291/044; G01N 2291/2634
(Continued)

(56) References Cited

U.S. PATENT DOCUMENTS 3,781,576 A * 12/1973 Runde .................. G10K 11/004
73/644
4,817,066 A * 3/1989 Takasugi ............. G01S 7/52017
367/137
(Continued)

FOREIGN PATENT DOCUMENTS

EP 3009834 A2 * 4/2016 ............ G01B 17/02
JP 2008185548 A 8/2008
(Continued)

OTHER PUBLICATIONS

International Search report and written opinion received for PCT application No. PCT/US2019/023613, dated Jul. 5, 2019, 11 pages.
(Continued)

*Primary Examiner* — Jacques M Saint Surin

(57) ABSTRACT

An ultrasonic measurement system includes abase apparatus, an ultrasonic transducer remote from the base apparatus, a temperature sensing system remote from the base apparatus, and an electrical cable. The base apparatus includes a power supply, a pulse transmitter/receiver; and a base apparatus controller operatively connected to the power supply and the pulse transmitter/receiver. The ultrasonic transducer includes a piezoelectric element. The temperature sensing system includes a temperature measurement instrument operatively connected to a temperature sensor. The electrical cable includes first and second electrical conductors with the first and second conductors electrically connecting the base apparatus, the ultrasonic transducer, and the temperature
(Continued)

sensing system. A method of measuring a thickness of an object and a further measurement system are also provided.

23 Claims, 4 Drawing Sheets

(52) U.S. Cl.
CPC ............... *G01N 2291/02854* (2013.01); *G01N 2291/044* (2013.01); *G01N 2291/2634* (2013.01)

(58) Field of Classification Search
USPC .......................................................... 73/597
See application file for complete search history.

(56) References Cited

U.S. PATENT DOCUMENTS

| | | | |
|---|---|---|---|
| 4,896,939 A | 1/1990 | O'Brien | |
| 5,507,183 A * | 4/1996 | Larue | G01N 29/09 |
| | | | 73/598 |
| 5,619,423 A * | 4/1997 | Scrantz | G01N 29/4463 |
| | | | 324/229 |
| 8,486,545 B2 * | 7/2013 | Lanning | G01N 27/82 |
| | | | 73/598 |
| 8,695,429 B2 * | 4/2014 | Urbano | G01S 7/5208 |
| | | | 73/602 |
| 8,974,366 B1 * | 3/2015 | Radziemski | H02J 7/025 |
| | | | 600/16 |
| 10,545,921 B2 * | 1/2020 | Ben Dayan | G06F 16/164 |
| 10,668,467 B2 * | 6/2020 | Vanapalli | B01L 3/5027 |
| 2008/0025372 A1 * | 1/2008 | Culbertson | G01K 7/023 |
| | | | 374/185 |
| 2009/0028211 A1 | 1/2009 | Amemiya | |
| 2011/0067497 A1 * | 3/2011 | Grubb | G01N 29/223 |
| | | | 73/623 |
| 2014/0331771 A1 | 11/2014 | Baba et al. | |
| 2021/0348919 A1 * | 11/2021 | Kloza | G01B 17/02 |

FOREIGN PATENT DOCUMENTS

| | | |
|---|---|---|
| KR | 10-2006-0030298 A | 4/2006 |
| KR | 10-2007-0014261 A | 2/2007 |
| KR | 10-0776450 B1 | 11/2007 |
| WO | 2019/183490 A1 | 9/2019 |

OTHER PUBLICATIONS

International Preliminary report on patentability received for PCT application No. PCT/US2019/023613, dated Oct. 1, 2020, 10 pages.
Extended European Search Report and Opinion received for EP Application No. 19771134.4, dated Nov. 12, 2021, 8 pages.

* cited by examiner

SYSTEM AND METHOD OF SUBMITTING DATA FROM INDIVIDUAL SENSORS OVER A SHARED CABLE

RELATED APPLICATIONS

This patent application is a national phase of International Application No. PCT/US2019/023613, filed Mar. 22, 2019, which claims the benefit of U.S. Patent Application No. 62/646,664, filed Mar. 22, 2018, which is are incorporated by reference in their entirety.

TECHNICAL FIELD

The present disclosure relates generally to ultrasonic measurement systems that monitor for pipe wall thinning in refineries, pipelines, paper mills, power plants and other heavy industry plants. The present disclosure more particularly relates to a temperature-compensated ultrasonic measurement system and a method of using same.

BACKGROUND

There is a demand to continuously monitor the health of various plants, e.g., refineries, pipelines, paper mills, power plants and other heavy industry plants, that have assets, such as pipes, vessels, valves, and boilers, that have wall thicknesses that may change or degrade over time. The integrity of the asset may be inspected either during operation (i.e., on-line or "on-stream") or during turnarounds in which the whole plant or certain assets are shut down. Therefore, on-line or on-stream inspection sometimes occurs when the temperature of the assets is elevated.

A selection of nondestructive testing techniques is covered by the governing industry standards such as API 510 or API 570. In general, one can distinguish between surface inspection techniques as visual testing, magnetic particle testing and liquid penetrant testing, and volumetric inspection techniques such as radiographic testing and ultrasonic testing. Ultrasonic wall thickness testing complemented by radiographic testing is the most common inspection technique used in the field.

The ultrasonic inspection in conventional routine plant inspection uses single-element, high-temperature ultrasonic transducers, which each include one piezoelectric element, to inspect assets for wall thinning or to inspect assets of a simple shape. Accurate on-stream monitoring for wall thinning of the asset may be difficult to achieve because the speed of the ultrasonic waves travelling through in the metallic material(s) commonly used in the asset(s) is temperature dependent. With reference to ASME BPVC Section V, Article 5 and Appendix SE 797/SE797-M, Section 9.5 states: "The apparent thickness reading obtained from steel walls having elevated temperatures is high (too thick) by a factor of about 1% per 55° C. [100° F.]." Thus, in order to accurately measure the thickness of a desired section of an asset, compensation or correction for the change in speed of the ultrasonic waves with temperature is desired. For example, in one embodiment, a thermocouple, a resistance temperature detector ("RTD") or other sensing component or system for measuring the temperature of the asset under inspection may be provided.

In order to appropriately calculate the thickness in view of the temperature reading from the ultrasonic transducer, it is desirable to mount a temperature sensing element or sensor on a target section of the asset and provide a cable for the temperature sensor between the temperature sensor and a signal-processing device (typically part of the ultrasonic thickness measurement device which may be permanently installed at a location within the plant) to acquire a signal from the temperature sensor. If the asset whose thickness is to be measured is a pipe provided in a plant, the section of the asset and the signal-processing device are often relatively distant from each other, e.g., distances of up to one-hundred feet. Thus, the cable for the temperature sensor needs to be laid as additional means for the temperature measurement. In such a case, the temperature sensor will usually be mounted at a location exposed to a high-temperature environment and may be located in a narrow, confined area which is difficult to access. Therefore, besides the cost associated with the extra required materials, it may also take a great deal of time and labor to mount the temperature sensor, install the temperature sensor cable, and to also maintain the temperature sensor cable.

As an example, standard temperature measurement methods are used to measure the temperature of an asset whose wall thickness is to be measured. Most of these methods use a physical temperature sensing element, such as an RTD or thermocouple, connected to a temperature measuring instrument using dedicated two, three or four-wire cable. For long distances, e.g., over 50 feet, between the temperature sensing element and the measurement instrument, the use of three or four-wire dedicated cable is a preferred method since it allows for the cancellation of the wires' resistance.

Another example combines some of the wires used to pulse the ultrasonic transducer with temperature sensor wires by sharing some, but not all, wires. One example is to share a ground wire (usually a shield of a cable) between the ultrasonic pulsing circuitry and the temperature measurement probe. In such a configuration, there is still a need to provide at least one more wire to the temperature sensing element. This configuration calls for at least a three-wire connection, namely, pulsing, temperature sensing, and ground leads.

U.S. Patent Publication No. 2014/0331771 discloses a method of connecting temperature sensing elements and ultrasonic transducers to the ultrasonic and temperature measuring instrument using a three-conductor cable. Such a method, however, is not desired as the normal practice to connect an ultrasonic transducer to the ultrasonic measurement instrument is to use a two-conductor cable (often controlled impedance coaxial). Thus, it would be both beneficial and desirable to use the same two-conductor cable for both the ultrasonic pulses and the temperature readings.

Certain individuals would appreciate an ultrasonic measuring system that, without additional wiring for temperature measurement, both compensates for a change in the speed of an ultrasonic wave with temperature in a section of an asset whose thickness is to be measured and assesses a wall thinning state of the section by highly accurate measurement of its thickness.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In a first aspect, an ultrasonic measurement system includes a base apparatus, an ultrasonic transducer remote from the base apparatus, a temperature sensing system remote from the base apparatus, and an electrical cable. The base apparatus includes a power supply, a pulse transmitter/receiver; and a base apparatus controller operatively connected to the power supply and the pulse transmitter/receiver. The ultrasonic transducer includes a piezoelectric element. The temperature sensing system includes a temperature measurement instrument operatively connected to a temperature sensor. The electrical cable includes first and second electrical conductors with the first and second conductors electrically connecting the base apparatus, the ultrasonic transducer, and the temperature sensing system.

In another aspect, a method of measuring a thickness of an object includes transmitting an electrical pulse from a base apparatus along a cable having first and second conductors to an ultrasonic transducer remote from the base apparatus, with the electrical pulse causing the ultrasonic transducer to generate an ultrasonic wave, directing the ultrasonic wave into the object, transmitting from the ultrasonic transducer to the base apparatus an analog electrical signal indicative of an entry echo wave generated as the ultrasonic wave enters a first wall of the object, and transmitting from the ultrasonic transducer to the base apparatus an analog electrical signal indicative of a back wall echo wave generated as the ultrasonic wave reflects off a second wall of the object. The method further includes transmitting a digital temperature measurement instruction from the base apparatus along the first and second conductors of the cable to a temperature sensing system remote from the base apparatus, determining a temperature of the object adjacent the ultrasonic transducer, transmitting temperature signals indicative of the temperature of the object adjacent the ultrasonic transducer from the temperature sensing system along the first and second conductors of the cable to the base apparatus, and determining the thickness of the object based upon timing of the entry echo wave, timing of the back wall echo wave, and the temperature signals from the temperature sensing system.

In still another aspect, a measurement system includes a base apparatus, an analog sensor remote from the base apparatus, a digital sensing system remote from the base apparatus, and an electrical cable. The base apparatus includes a power supply and a base apparatus controller operatively connected to the power supply. The digital sensing system includes a digital measurement instrument operatively connected to a sensor and a power storage unit configured to provide power to at least some components of the digital sensing system. The electrical cable includes first and second electrical conductors with the first and second conductors electrically connecting the base apparatus, the analog sensor, and the digital sensing system.

BRIEF DESCRIPTION OF THE DRAWINGS

Various objects, features and attendant advantages will become more fully appreciated as the same becomes better understood when considered in conjunction with the accompanying drawings in which like reference characters designate the same or similar parts throughout the several views, and in which.

DETAILED DESCRIPTION

The following description is intended to convey the operation of exemplary embodiments of the invention to those skilled in the art. It will be appreciated that this description is intended to aid the reader, not to limit the invention. As such, references to a feature or aspect are intended to describe a feature or aspect of an embodiment of the invention, not to imply that every embodiment of the invention must have the described characteristic. Furthermore, it should be noted that the depicted detailed description illustrates a number of features. While certain features have been combined together to illustrate potential system designs, those features may also be used in other combinations not expressly disclosed for purposes of brevity to form additional combinations that were not otherwise shown for purposes of brevity.

Figure 1:
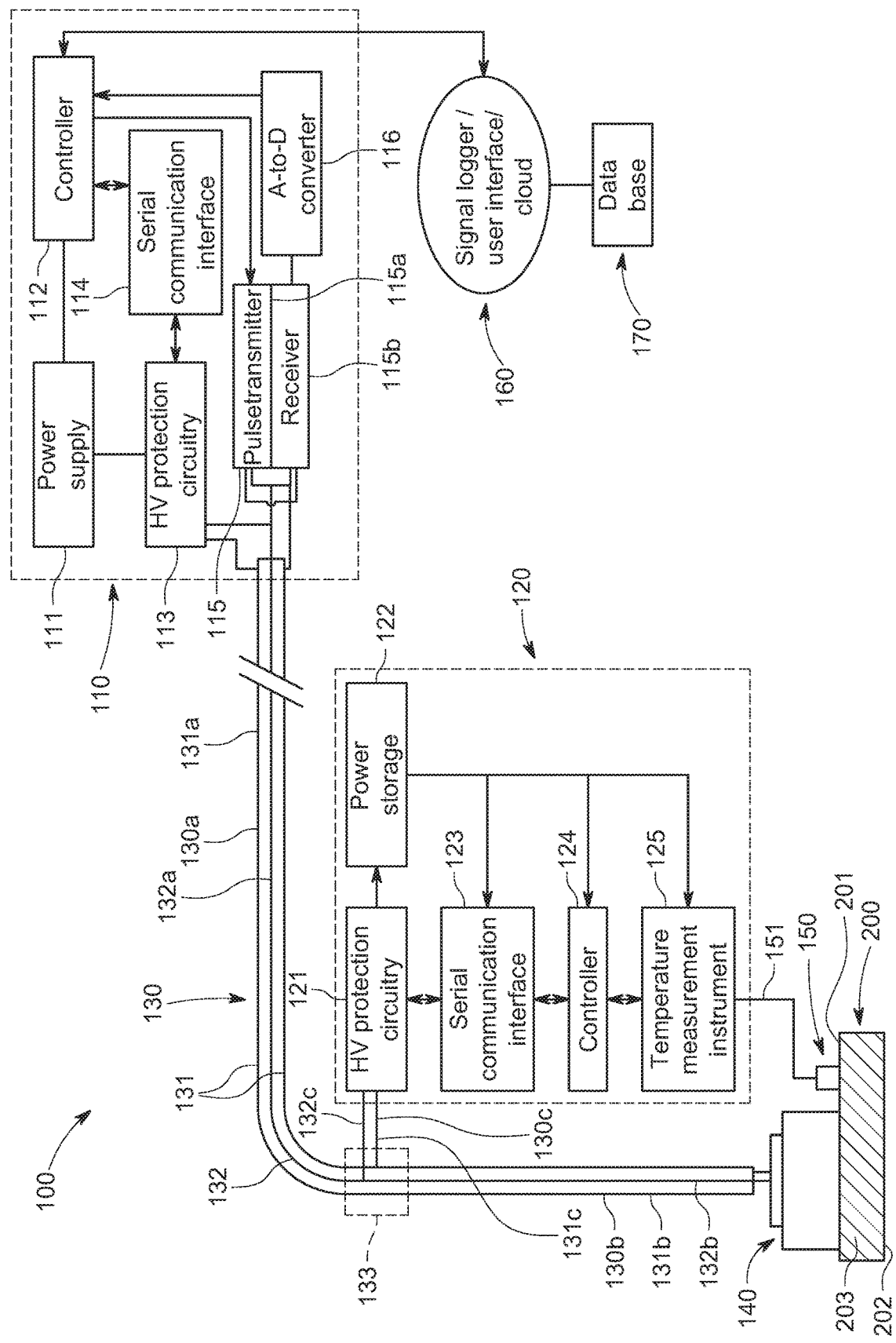
FIG. 1 illustrates features of an embodiment of the system for measuring the thickness of an object as described herein.

FIG. 1 illustrates features of an embodiment of a system 100 that, without additional wiring for temperature measurement, compensates for temperature when using an ultrasonic wave to assess a wall thinning state of a section of an asset. The system 100 utilizes an innovative way to measure and transmit the temperature of the section of the asset 200 since an accurate temperature measurement of the section of the asset 200 is required for wall thickness temperature compensation.

The system 100 includes an ultrasonic wall thickness measurement system 110, a temperature measurement system 120, a cable 130, an ultrasonic transducer 140, a temperature sensing element 150, a cloud-based user interface 160, and a database 170.

The ultrasonic wall thickness measurement system 110 may be configured as a base unit including a power supply 111, a controller 112, a high voltage (HV) protection circuitry 113, a serial communications interface 114, a pulse transmitter/receiver 115, and an analog-to-digital converter 116 which communicate with each other as illustrated in FIG. 1. Power supply 111 is configured to provide power to the ultrasonic wall thickness measurement system 110 including the controller 112 and also supply power to the temperature measurement system 120 as described in further detail below.

The controller 112 is configured to control the operation of the power supply 111 and the pulse transmitter/receiver 115 as well as provide signals through the serial communication interface 114 to control the temperature measurement system 120. More specifically, the controller 112 operates to instruct or command the power supply 111 to generate signals sufficient to charge the power storage unit 122 of the temperature measurement system 120 as described in more detail below, generate digital instructions through the serial communication interface 114 to instruct or command the controller 124 and/or temperature measurement instrument 125 of the temperature measurement system 120 to determine the temperature at the temperature sensing element 150 as described in more detail below, and instruct or command the pulse transmitter/receiver 115 to generate the desired electrical pulses as described in more detail below. The signals generated by the power supply 111 to charge the power storage unit 122 of the temperature measurement system 120 may typically be in the range of 1.8-5 V and have a duration of 10-300 ms. Other ranges are contemplated. In an embodiment, a voltage of 3 V and 100 ms may be used.

The controller 112 may also configured to communicate with the cloud-based user interface 160 which, in turn, is configured to communicate with the database 170.

The high voltage protection circuitry 113 is configured to protect the serial communication interface 114 from power supplied by power supply 111 and from pulses generated by the transmitter section 115a of the pulse transmitter/receiver 115. The high voltage protection circuitry 113 may be configured as a low-pass filter in which the lower frequency and lower power signals from the power supply 111 are permitted to pass while the higher frequency and higher voltage pulses generated by pulse transmitter/receiver 115 and transmitted along the cable 130 are blocked or filtered.

The controller 112 may be any type of electronic controller or electronic control module such as a microprocessor or microcontroller configured to control the operation of various aspects of the system 110. The controller 112 operates in a logical fashion to perform operations, execute control algorithms, store and retrieve data and other desired operations. The controller 112 may include or access memory, secondary storage devices, processors, communication interfaces and/or devices and any other components for running an application. The memory and secondary storage devices may be in the form of read-only memory (ROM), random access memory (RAM), electrically erasable memory (EEPROM or FLASH) or integrated circuitry that is accessible by the controller. Various other circuits may be associated with the controller 112 such as power supply circuitry, signal conditioning circuitry, driver circuitry, and other types of circuitry.

The controller 112 may be a single controller or may include more than one controller configured to control various functions and/or features of the system 100. The term "controller" is meant to be used in its broadest sense to include one or more controllers and/or microprocessors that may be associated with the system 100 and that may cooperate in controlling various functions and operations of the system. The functionality of the controller 112 may be implemented in hardware and/or software without regard to the functionality. The controller 112 may rely on one or more data maps relating to the operating conditions and the operating environment of the system 100 that may be stored in the memory of controller. Each of these data maps may include a collection of data in the form of tables, graphs, and/or equations. The controller 112 may be located on the thickness measurement system 110 and, in some instances, may also include components located remotely from the thickness measurement system.

While the specific serial communications interface 114 used can vary, the most common serial communications interface 114 is an asynchronous serial port with shorted transmit and receive pins on the microprocessor 112, but most one-wire serial interfaces will also work. In another embodiment, a communications interface may be based on or similar to a two-wire bi-directional RS-485 hardware interface. The pulse transmitter/receiver 115 includes a transmitter section 115a and a receiver section 115b. In embodiments, the transmitter section 115a and the receiver section 115b may be part of a single component or separate components.

The transmitter section 115a is configured to generate an electrical pulse based upon an instruction or command from the controller 112 and transmit the pulse along cable 130. In embodiments, a pulse generated by the transmitter section 115a is sufficient to cause the ultrasonic transducer 140 to generate a desired ultrasonic wave. In an embodiment, the pulse may have a duration of 100 ns and have a voltage of 60 V. Other pulse lengths and voltages are contemplated. For example, the pulse length is often a function of the natural frequency of the ultrasonic transducer. Further, the voltage of the pulse may often range between 30-90 V, but in some embodiments may range to several hundred volts, with the voltage being a function of the thickness of the section of the asset 200 to be measured.

The receiver section 115b is configured to receive analog electrical signals in the form of pulses that are reflected back along cable 130 as described in more detail below. The electrical signals are then converted by the analog-to-digital converter 116 to digital signals that are sent to the controller 112 for processing and/or analysis.

The temperature measurement system 120 includes a HV protection circuitry 121, a power storage unit 122, a serial communications interface 123, a controller 124, and a temperature measurement instrument 125, which communicate with each other as illustrated in FIG. 1. The high voltage protection circuitry 121 is configured to protect the components of the temperature measurement system 120 from the (relatively) high voltage and high frequency electrical signals that are transmitted along cable 130. The high voltage protection circuitry may be configured as a low-pass filter in which the lower frequency and lower power signals from the power supply 111 are permitted to pass while the higher frequency and higher voltage pulses generated by pulse transmitter/receiver 115 and transmitted along the cable 130 are blocked or filtered.

The power storage unit 122 may be configured to be charged and discharged during an operating cycle in order to provide power to the serial communication interface 123, the controller 124, and the temperature measurement instrument 125. In an embodiment, the power storage unit 122 may comprise a capacitor. In other embodiments, the power storage unit may comprise a battery, an inductor, or another structure operative to store the power necessary to operate the temperature measurement system 120.

In embodiments, the serial communication interface 123 may be configured in a manner similar or identical to the serial communication interface 114 described above. In embodiments, the controller 124 may be configured in a manner similar or identical to the controller 112 described above. In other embodiments, the controller 124 may have less functionality than the controller 112 described above. The controller 124 may be configured to receive digital signals from the controller 112 and instruct or command the temperature measurement system 125 to carry out a temperature measurement operation and return, via the serial communication interface 123, either raw temperature data or a scaled temperature reading (e.g., a determined or calculated temperature in F° or C°; of the temperature sensing element 150. Still further, the controller 124 may be configured to store information, such as either within an on-board, non-volatile memory (e.g., EEPROM or FLASH) or other memory, with respect to the temperature measurement system 120 and/or the temperature sensing element 150. Such information may include, for example, identification information (e.g., a serial number) as well as maximum and/or minimum temperatures to which the temperature sensing element 150 has been exposed.

The temperature measurement instrument 125 may be configured in any desired manner. In one example, a temperature measurement circuit of the temperature measurement system 125 comprises a temperature sensing element 150 such as an RTD probe, e.g., PT-1000 type, and a biasing resistor connected to an analog-to-digital converter measuring voltage on the RTD. The voltage is converted to the equivalent RTD resistance which, via a look-up table, will be converted into a temperature reading at either controller 124 or controller 112. Other configurations of temperature measurement circuits are contemplated. For example, thermocouple or infrared-based circuits can be used to achieve similar temperature measurement results. The temperature measurement system 120 is configured to be located proximate to the temperature sensing element 150.

The ultrasonic transducer 140 is configured to be mounted on a section of an asset 200 whose thickness is to be measured. The asset 200 may be, for example, a pipe, vessel, valves, boilers, which may experience elevated temperatures while a plant is in service. The ultrasonic transducer 140 may be configured as a piezoelectric element that generates ultrasonic waves upon being excited by the high voltage pulse from the pulse transmitter/receiver 115 and converts ultrasonic waves back into electrical waves or signals.

Figure 2:
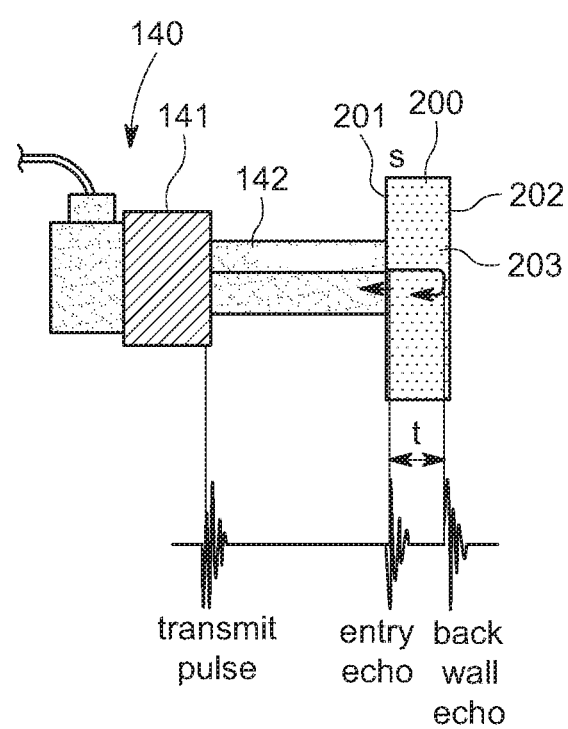
FIG. 2 illustrates an exemplary transducer element and object to be measured.

For example, referring to FIG. 2, an ultrasonic transducer 140 is depicted which includes piezoelectric element 141 and a ceramic spacing element or spacer 142 engaging a section of an asset 200 such as a pipe having a first or near surface 201 in contact with the spacer and a second or far surface 202 of a wall 203. In other embodiments, the spacer 142 may be omitted.

In operation, a high voltage pulse is generated by pulse transmitter/receiver 115 and travels along cable 130 until reaching the ultrasonic transducer 140. An ultrasonic wave is generated by the transducer 140 and travels through the spacer 142 until reaching the near surface 201 of the wall 203. A portion of the ultrasonic wave is reflected back by the near surface 201 and through the ceramic spacer 142 until reaching the piezoelectric element 141 at which it is converted back into an electrical wave form. This electrical wave form travels back along cable 130 until reaching the receiver section 115b of the pulse transmitter/receiver 115. This waveform may be referred to as an entry echo since it is generated based upon the ultrasonic wave entering or contacting the near surface 201 of the asset to be measured.

The remaining portion of the ultrasonic wave passes through the wall 203 of the asset 200 until reaching the far surface 202 where which a second ultrasonic wave is reflected back through the asset. The second reflected wave travels back through the ceramic spacer 142 until reaching the piezoelectric element 141 at which it is converted into a second electrical wave form. The second electrical wave form travels back along the cable 130 until reaching the receiver section 115b of the pulse transmitter/receiver 115. This second waveform may be referred to as a back wall echo since it is generated based upon the ultrasonic wave contacting the back wall or far surface 202 of the asset 200 to be measured.

In an embodiment, it may be desirable to mount the temperature sensing element 150 in close proximity (e.g., 0.5 to 1 inch) to the ultrasonic transducer 140 on the section of the asset 200 whose thickness is to be measured. In another embodiment, the temperature sensing element 150 may be mounted directly on the ultrasonic transducer 140 or the temperature sensing element 150 may be integrated into the ultrasonic transducer 140. The temperature sensing element 150 is configured to communicate with the temperature measurement instrument 125 via a cable 151. The cable 151 may be any suitable cable and is not limited to a two conductor cable.

The cable 130 has a first conductor 131 and a second conductor 132 and thus may be configured as a cable with only two conductors. However, the cable 130 may have any desired configuration. In the depicted embodiment, the cable 130 is configured as a coaxial cable with a first outer conductor 131 surrounding a second inner conductor 132. In a coaxial cable, the outer conductor often operates as a shield, a return or a ground signal for the inner conductor. In another embodiment, the cable 130 may comprise a twisted-pair cable.

As depicted in FIG. 1, the cable 130 has a first length or section 130a, including a length 131a of the first conductor 131 and a length 132a of the second conductor 132, that extends from the ultrasonic wall thickness measurement system 110 a substantial distance to a splitter 133 that splits the cable (i.e., the first conductor 131 and the second conductor 132) to define a first additional cable section 130b and a second additional cable section 130c. The first additional cable section 130b includes a first conductor 131b and a second conductor 132b and the second additional cable section 130c includes a first conductor 131c and a second conductor 132c. With the splitter 133, the first length of conductor 131a of the first section 130a is electrically connected to the first conductor 131b of the first additional cable section 130b and the first conductor 131c of the second additional cable section 130c. Further, the splitter 133 electrically connects the length 132a of the second conductor 132 of the first section 130a to the second conductor 132b of the first additional cable section 130b and the second conductor 132c of the second additional cable section 130c.

Other configurations of the cable 130 are contemplated. For example, the first cable section 130a may extend from the ultrasonic wall thickness measurement system 110 to the ultrasonic transducer 140 with a cable similar to the second additional cable section 130c electrically connected to the first cable section 130a at or adjacent the connection between the first cable section and the ultrasonic transducer. In such case, the first additional cable section 130b may be eliminated and the first cable section 130a may extend from the ultrasonic wall thickness measurement system 110 to the ultrasonic transducer 140.

Regardless of the configuration, the first cable section 130a may be configured to include only two conductors 130b, 130c that each defines a distinct electrical path. The additional cable sections that extend from the first cable section 130a may also be configured to only include two conductors that each defines a distinct electrical path. Each conductor 131b, 131c, 132b, 132c of the additional cable sections 130b, 130c is electrically connected to a respective one of the conductors 131a, 132a of the first cable section 130a. Thus, the cable 130 includes only two electrically distinct or separate conductors or paths having different electrical potentials even though the first cable section 130a and the first and second additional cable sections 130b, 130c each include first and second conductors. Accordingly, as used herein, reference to the cable 130 having "only two conductors" refers to a configuration having only two electrical paths, each having a different electrical potential.

The cable 130 electrically connects the ultrasonic transducer 140 to the ultrasonic wall thickness measurement system 110. More specifically, the first conductor 131a of first cable section 130a and the first conductor 131b of the first additional cable section 130b connect the ultrasonic transducer 140 to the HV protection circuitry 113 and the pulse transmitter/receiver 115, and the second conductor 132a of the first cable section 130a and the second conductor 132b of the first additional cable section 130b connect the ultrasonic transducer 140 to both the HV protection circuitry 113 and the pulse transmitter/receiver 115. The cable 130 may extend a substantial distance between the location of the ultrasonic transducer 140 and the location of the ultrasonic wall measurement system 110. For example, the cable 130 may extend a distance of well over 100 feet.

The cable 130 is also connected to the temperature measurement system 120 at a position proximate to the section of the asset 200 to be measured. More specifically, the second additional cable section 130c is connected to the first cable section 130a and the first additional cable section 130b through the splitter 133. In addition, the first conductor 131c and the second conductor 132c of the second additional cable section 130c are both connected to the HV protection circuitry 121. The temperature measurement system 120 may be located remotely from the ultrasonic wall thickness measurement system 110. For example, the temperature measurement system 120 may be located well over 100 feet away from the ultrasonic wall thickness measurement system 110.

Figure 3:
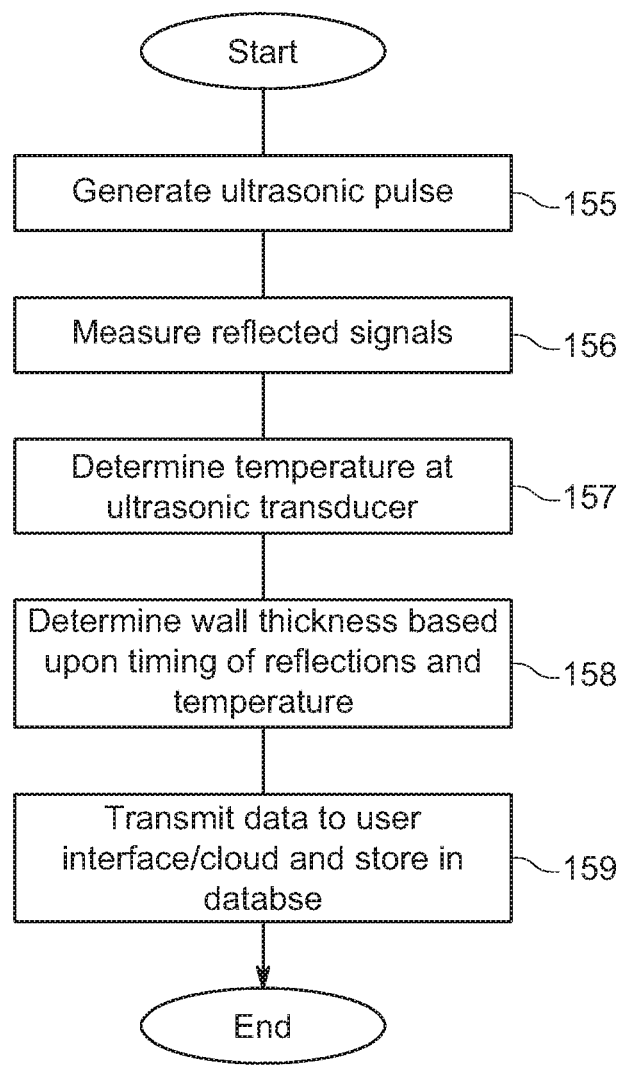
FIG. 3 illustrates a flowchart of a process for determining the thickness of an object in accordance with the principles disclosed herein.
Figure 4:
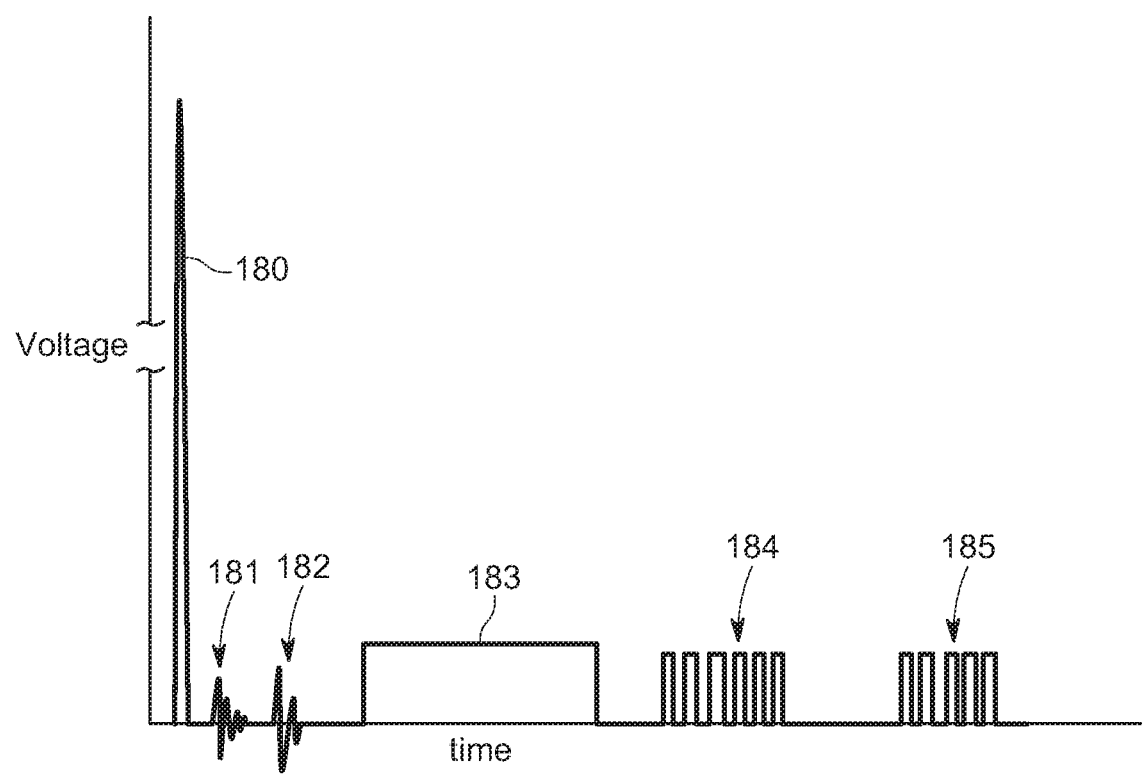
FIG. 4 illustrates a simulated graph depicting voltage as a function of time along the cable of the system disclosed herein.

Referring to FIG. 3, a flowchart is depicted of a process for performing a measurement of the wall thickness of the section of the asset 200 using the system 100. At stage 155, an ultrasonic pulse is transmitted from the ultrasonic wall measurement system 110 to the ultrasonic transducer 140. More specifically, the controller 112 generates and transmits an instruction or command to the pulse transmitter/receiver 115 to send a high voltage pulse 180 (FIG. 4) to the ultrasonic transducer 140. In an embodiment, the high voltage pulse may have a duration of approximately 100 ns and have a voltage of between 30-90 V. As depicted, the high voltage pulse 180 travels along the second conductor 132a of the first cable section 130a and the second conductor 132b of the first additional cable section 130b until reaching the ultrasonic transducer 140. The high voltage pulse 180 causes the piezoelectric element 141 of the ultrasonic transducer 140 to generate an ultrasonic wave that passes through the spacer element 142 into the asset 200. HV protection circuitry 121 filters, blocks, or limits the high voltage pulse 180 from passing further into the temperature measurement system 120.

At stage 156, the reflected signals from the ultrasonic transducer are measured. More specifically, a portion of the ultrasonic wave is reflected back by the first or near surface 201 to create an entry echo wave that is received by the piezoelectric element 141 and converted into an analog electrical waveform depicted at 181 in FIG. 4. The analog waveform of the entry echo wave 181 is transmitted along cable 130 and received at the receiver section 115b of the pulse transmitter/receiver 115 and travels to the analog-to-digital converter 116 and then to the controller 112.

A second portion of the ultrasonic wave generated by the piezoelectric element 141 travels through the asset 200 and is reflected back by the second or far surface 202 to create a back wall echo wave that is received by the piezoelectric elements and converted into an analog electrical waveform depicted at 182. The analog electrical waveform of the back wall echo wave 182 is transmitted along cable 130 and received at the receiver section 115b of the pulse transmitter/receiver 115 and travels to the analog-to-digital converter 116 and then to the controller 112.

The serial communications interface 114 as well as the power supply 111 are protected from the high voltage pulse generated by the pulse/transmitter receiver 115 by the high voltage protection circuitry 113. Further, even though the second conductor 132a of the first cable section 130a is electrically connected to the second conductor 132c of the second additional cable section 130c, the power storage 122, the serial communications interface 123, the controller 124, and temperature measurement instrument 125 are protected from the high voltage pulse generated by the pulse transmitter/receiver 115 by the high voltage protection circuitry 121.

At stage 157, the temperature at or adjacent to the ultrasonic transducer 140 may be determined. To do so, the controller 112 generates and transmits an instruction or command to the power supply 111 to send an appropriate signal through the second conductor 132a of the first cable section 130a and the second conductor 132c of the second additional cable section 130c to the temperature measurement system 120. In an embodiment, the signal may have a duration of between 10-300 ms and a voltage range of 1.8-5.0 V. The signal or signals used to charge the power storage unit 122 are depicted at 183 in FIG. 4. The signal 183 sent by the power supply 111 is sufficient to charge the power storage unit 122. Due to the low frequency nature of the signal, it passes through the high voltage protection circuitry 121.

After a predetermined period of time (i.e., a time sufficient to permit the power storage unit 122 to be sufficiently charged), the controller 112 may generate and transmit a digital temperature measurement instruction or command 184 through the serial communication interface 114 and the high voltage protection circuitry 113 to the temperature measurement system 120. More specifically, the digital temperature measurement instruction or command 184 passes along the second conductor 132a of the first cable section 130a and the second conductor 132c of the second additional cable section 130c, through the high voltage protection circuitry 121 and the serial communication interface 123 to the controller 124. In an example, the temperature measurement instruction or command 184 may be sent at a rate of approximately 10 kHz so that it passes through the high voltage protection circuitry 121.

Upon receiving the temperature measurement instruction or command 184, the controller 124 may generate and transmit a signal to the temperature measurement instrument 125 to read the resistance at the temperature sensing element 150. The temperature measurement instrument 125 reads the resistance at the temperature sensing element 150 and sends the information to the controller 124. In one embodiment, the controller 124 may determine the scaled temperature reading at the temperature sensing element 150 such as through lookup tables associated with the controller 124 and send the scaled temperature reading and any other desired data (the scaled temperature reading and any other data being indicated at 185) through the serial communications interface 124 using serial data protocol and back through the second conductor 132c of the second additional cable section 130c and the second conductor 132a of the first cable section 130a to the ultrasonic wall thickness measurement system 110. At the ultrasonic wall thickness measurement system 110, the data 185 passes through the high voltage protection circuitry 113 and the serial communications interface 114 to the controller 112. In an example, the data 185 may be sent at a rate of approximately 10 kHz so that it passes through the high voltage protection circuitry 113 and the high voltage protection circuitry 121.

In an alternate embodiment, the raw temperature sensor signals or data may be transmitted by the controller 124 to the controller 112 and the analysis of the temperature at the temperature sensing element 150 performed by controller 112.

The signal 183 used to charge the power storage unit 122, the signal temperature measurement instruction signal 184, and the data 185 are each a low enough frequency and voltage that they do not sufficiently excite the piezoelectric element 141 of the transducer unit 140.

Although depicted with stages 155-156 occurring before stage 157, the temperature measurement process may occur before the ultrasonic measurement process. In either case, it is typically desirable to perform both operations relatively contemporaneously or close in time. However, it may be desirable not to perform the processes simultaneously as the reflective signals or waveforms generated at stage 156 may be relatively small or weak analog signals and overlapping with the various digital signals generated at stage 157 may reduce the accuracy of or complicate the analysis of the reflected analog signals. In other embodiments, filter systems may be used and the operations performed simultaneously.

At stage 158, the controller 112 may determine the wall thickness S of the asset 200 with the following formula:

$$S = V(\text{temp}) \cdot \frac{t}{2} \tag{1}$$

where V (temp) is the velocity of sound as a function of temperature and t is the time between the entry echo wave and the back wall echo wave. The controller 112 may calculate the time between the entry echo wave and the back wall echo wave in any desired manner. In one example, the controller may determine the time between the peaks of the entry echo wave and the back wall echo wave. In an embodiment, the controller 112 may determine the velocity of sound as a function of temperature based upon data from a lookup table within or associated with the controller. Other manners of determining temperature compensated wall thickness are contemplated. For example, a temperature compensated wall thickness may be determined based upon thickness readings made at two or more different temperatures.

At stage 159, the controller 112 may transmit the wall thickness data together with other data such as date and time, associated temperature, and other desired information to a user interface and/or the cloud 160. In addition, such data may be stored within a database 170.

Various alternative configurations are contemplated in which data from at least two sensors is sent over a cable 130 having only two conductors. The disclosed system permits the use of a first analog sensor such as the ultrasonic transducer 140 and a digital sensor such as the temperature measurement instrument 125 and temperature sensing element 150. Other analog sensors including vibration sensors could also be used. Further, other digital sensors including pressure sensors, humidity sensors, and light sensors could also be used.

Further, in an embodiment, the temperature measurement instrument 125 may include additional functionality and the controller 124 eliminated. In one embodiment, the temperature measurement instrument 125 may receive instructions from the controller 112. In another embodiment, the temperature measurement instrument may include the functionality of the controller 124 necessary to perform the desired operations.

Still further, although each of the high voltage protection circuitry 113, 121 is described as low-pass filters since the high voltage pulse has a relatively high frequency, other configurations are contemplated. For example, since the electrical pulse generated by the pulse transmitter/receiver 115 has a relatively high voltage, the high voltage protection circuitry may be configured to limit the amplitude of any passing signals. In an embodiment, the high voltage protection circuitry may be configured with a Zener diode to limit the voltage of signals that may pass.

In addition, the temperature measurement instrument 125 may be operatively connected to a second temperature sensing device (not shown). For example, the second temperature sensing device may be operatively connected to the ultrasonic transducer 140 to determine the temperature at a location on the transducer. Further, in an embodiment, one or more temperature sensing elements 150 or other digital sensors may be operatively connected to an analog sensor, such as to determine characteristics of the analog sensor or the operating environment of the analog sensor.

From the foregoing, it may be understood that the two-wire or two-conductor solution described and illustrated herein permits the installation and use of a wall thickness analysis system with temperature compensation at the same wiring cost as a non-temperature compensating wall thickness analysis system. Further, existing two-wire ultrasonic measurement cabling can be re-used to provide both wall thickness and temperature measurement information. In general, in industrial settings, e.g., refineries, pipelines, heavy industry plants, the wiring cost of a new instrument installation can be a substantial percentage of the total installation cost. Reducing the number of required wires or reusing existing wiring provides significant cost savings.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

We claim:

1. An ultrasonic measurement system comprising:
  A base apparatus, the base apparatus including:
    a power supply;
    a pulse transmitter/receiver; and
    a base apparatus controller operatively connected to the power supply and the pulse transmitter/receiver;
  an ultrasonic transducer remote from the base apparatus, the ultrasonic transducer including a piezoelectric element;

a temperature sensing system remote from the base apparatus, the temperature sensing system including a temperature measurement instrument operatively connected to a temperature sensor; and an electrical cable, the electrical cable including only first and second electrically distinct conductors, the first and second conductors electrically connecting the base apparatus, the ultrasonic transducer, and the temperature sensing system.

2. The system of claim 1, wherein the power supply, the pulse transmitter/receiver, and the temperature measurement instrument are each operatively connected to the first and second conductors.

3. The system of claim 1, wherein the base apparatus controller is configured to:

generate a command for the pulse transmitter/receiver to generate an electrical pulse;

receive, from the pulse transmitter/receiver, signals indicative of reflective waves received by the ultrasonic transducer; and generate a command for the temperature sensing instrument to measure a temperature at the temperature sensor.

4. The system of claim 3, wherein the base apparatus controller is further configured to receive digital signals from the temperature measurement instrument indicative of a temperature at the temperature sensor.

5. The system of claim 4, wherein the ultrasonic transducer is disposed adjacent an object and the temperature sensor is disposed adjacent the ultrasonic transducer, and the base apparatus controller is further configured to determine a thickness of the object based upon timing of the signals indicative of the reflective waves, and the temperature signals from the temperature measurement instrument.

6. The system of claim 1, wherein the temperature sensing system further includes a power storage unit disposed at the temperature sensing system, the power storage unit being electrically connected to the first and second conductors of the cable and being further configured to provide power to at least some components of the temperature sensing system.

7. The system of claim 6, wherein the base apparatus controller is configured to generate a command for the power supply to generate a charging signal to charge the power storage unit.

8. The system of claim 1, wherein the temperature sensing system further includes filter circuitry to electrically isolate the temperature sensing system from electrical pulses transmitted by the base apparatus.

9. The system of claim 8, wherein the filter circuitry is disposed between the first and second conductors of the cable and other components of the temperature sensing system.

10. The system of claim 9, wherein the filter circuitry is a low-pass filter.

11. The system of claim 1, wherein the electrical cable is a coaxial cable, wherein the first conductor is an outer conductor and the second conductor is an inner conductor, and wherein the first conductor surrounds the second conductor.

12. A method of measuring a thickness of an object, the method comprising:

a) transmitting an electrical pulse from a base apparatus along a cable having only first and second electrically distinct conductors to an ultrasonic transducer remote from the base apparatus, the electrical pulse causing the ultrasonic transducer to generate an ultrasonic wave;

b) directing the ultrasonic wave into the object;

c) transmitting from the ultrasonic transducer to the base apparatus an analog electrical signal indicative of an entry echo wave generated as the ultrasonic wave enters a first wall of the object;

d) transmitting from the ultrasonic transducer to the base apparatus an analog electrical signal indicative of a back wall echo wave generated as the ultrasonic wave reflects off a second wall of the object;

e) transmitting a digital temperature measurement instruction from the base apparatus along the first and second conductors of the cable to a temperature sensing system remote from the base apparatus;

f) determining a temperature of the object adjacent the ultrasonic transducer;

g) transmitting temperature signals indicative of the temperature of the object adjacent the ultrasonic transducer from the temperature sensing system along the first and second conductors of the cable to the base apparatus; and h) determining the thickness of the object based upon timing of the entry echo wave, timing of the back wall echo wave, and the temperature signals from the temperature sensing system.

13. The method of claim 12, further comprising periodically providing power from a power storage unit disposed at the temperature sensing system to provide power to at least some components of the temperature sensing system.

14. The method of claim 13, further comprising periodically charging the power storage unit.

15. The method of claim 14, further comprising transmitting a charging signal from the base apparatus along the first and second conductors of the cable to the power storage unit to charge the power storage unit.

16. The method of claim 12, further including electrically protecting the temperature sensing system from the electrical pulse transmitted by the base apparatus.

17. The method of claim 16, wherein the electrically protecting step includes disposing filter circuitry between the first and second conductors of the cable and other components of the temperature sensing system.

18. The method of claim 17, wherein the filter circuitry is a low-pass filter.

19. The method of claim 12, wherein steps a)-g) occur in time proximity to each other and steps a)-d) do not overlap in time with steps e)-g).

20. The method of claim 12, wherein the cable is a coaxial cable, wherein the first conductor is an outer conductor and the second conductor is an inner conductor, and wherein the first conductor surrounds the second conductor.

21. A measurement system comprising:

a base apparatus, the base apparatus including:
  a power supply; and
  a base apparatus controller operatively connected to the power supply;

an analog sensor remote from the base apparatus;

a digital sensing system remote from the base apparatus, the digital sensing system including a digital measurement instrument operatively connected to a sensor and a power storage unit configured to provide power to at least some components of the digital sensing system; and an electrical cable, the electrical cable including only first and second electrically distinct conductors, the first and second conductors electrically connecting the base apparatus, the analog sensor, and the digital sensing system.

22. The system of claim 21, wherein the base apparatus controller is configured to:
  generate a command to operate the analog sensor;
  generate a command for the power supply to generate a charging signal to charge the power storage unit; and
  generate a command for the digital sensing instrument to perform a measurement.

23. The system of claim 21, wherein the electrical cable is a coaxial cable, wherein the first conductor is an outer conductor and the second conductor is an inner conductor, and wherein the first conductor surrounds the second conductor.

* * * * *